United States Patent
Hamaguchi et al.

(10) Patent No.: US 8,717,992 B2
(45) Date of Patent: May 6, 2014

(54) WIRELESS COMMUNICATION SYSTEM, WIRELESS TRANSMISSION APPARATUS AND WIRELESS TRANSMISSION METHOD

(75) Inventors: Yasuhiro Hamaguchi, Osaka (JP); Kazunari Yokomakura, Osaka (JP); Osamu Nakamura, Osaka (JP); Jungo Goto, Osaka (JP); Hiroki Takahashi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 305 days.

(21) Appl. No.: 13/255,811

(22) PCT Filed: Jan. 13, 2010

(86) PCT No.: PCT/JP2010/050281
§ 371 (c)(1),
(2), (4) Date: Nov. 22, 2011

(87) PCT Pub. No.: WO2010/103862
PCT Pub. Date: Sep. 16, 2010

(65) Prior Publication Data
US 2012/0063398 A1  Mar. 15, 2012

(30) Foreign Application Priority Data
Mar. 10, 2009  (JP) ................ 2009-056862

(51) Int. Cl.
*H04W 4/00* (2009.01)
*H04B 7/185* (2006.01)
*H04L 27/34* (2006.01)
*H04W 40/08* (2009.01)
*H04W 40/10* (2009.01)

(52) U.S. Cl.
CPC ......... *H04L 27/3405* (2013.01); *H04L 27/3411* (2013.01); *H04W 40/08* (2013.01); *H04W 40/10* (2013.01)
USPC .......................................... 370/329; 370/318

(58) Field of Classification Search
USPC .................................................. 370/318, 329
See application file for complete search history.

(56) References Cited

U.S. PATENT DOCUMENTS

| 8,422,434 | B2* | 4/2013 | Vijayan et al. | 370/329 |
| 2001/0034475 | A1* | 10/2001 | Flach et al. | 600/300 |
| 2012/0113924 | A1* | 5/2012 | Kashiwagi et al. | 370/329 |

FOREIGN PATENT DOCUMENTS

JP  2009-021787 A  1/2009

OTHER PUBLICATIONS

Sharp. "Remaining issues on the Uplink Transmission Scheme", 3GPP TSG-RAN WG1#55bis, R1-090021, Ljubljana, Slovenia, Jan. 12-16, 2009.

(Continued)

*Primary Examiner* — Kenny Lin
(74) *Attorney, Agent, or Firm* — Birch, Stewart, Kolasch & Birch, LLP

(57) ABSTRACT

Even when communication is performed independently in each CC (Component Carrier), the occurrence of an error in communication is prevented. Provided is a wireless communication system in which a wireless transmission apparatus and a wireless reception apparatus communicate with each other using a plurality of system frequency bands, wherein the wireless transmission apparatus performs transmission power control on transmission data in each of the system frequency bands, and furthermore, a maximum transmission power which can be transmitted in each of the system frequency bands can be controlled so as to be different from each other. Priorities are set on each of the system frequency bands, and transmission powers of the system frequency bands are determined in descending order of the priorities.

10 Claims, 2 Drawing Sheets

(56) References Cited

OTHER PUBLICATIONS

3GPP TS 36.213 V8.5.0 (Dec. 2008) [Relevant Section: 5.1].
Alcatel-Lucent Shanghai Bell, Alcatel-Lucent, "Power scaling method for maximum power", 3GPP TSG RAN WG1 Meeting #60, R1-100920, Feb. 22-26, 2010.
CATT, "Considerations on uplink power control in LTE-Advanced", 3GPP TSG RAN WG1 meeting #59bis, R1-100071, Jan. 18-22, 2010.
Ericsson, "Carrier aggregation", TSG-RAN WG1 #54bis, R1-083750, Sep. 29-Oct. 3, 2008.
InterDigital Communications, LLC., "Proposed Way Forward on UL Power Control for LTE-A Bandwidth Extension", 3GPP TSG-RAN WG1 Meeting #58, R1-093070, Aug. 24-28, 2009.
LG Electronics, "Uplink multiple channel transmission in case of UE transmit power limitation", 3GPP TSG RAN WG1#56, R1-090655, Feb. 9-13, 2009.
Nokia Siemens Networks, Nokia, "PUSCH Power Control for LTE-Advanced", 3GPP TSG RAN WG1 #56 Meeting, R1-090738, Feb. 9-13, 2009.
Qualcomm Incorporated, "UL Power Control for Multicarrier Operation", 3GPP TSG RAN WG1 #59bis, R1-100677, Jan. 18-22, 2010.
Research in Motion UK Limited, "Remaining issues on Uplink Power Control for Carrier Aggregation", 3GPP TSG RAN WG1, Meeting #59bis, R1-100569, Jan. 18-22, 2010.
Samsung, "UL Transmission Power Control in LTE-A", 3GPP TSG RAN WG1 #59bis, R1-091250, Mar. 23-27, 2009.

\* cited by examiner

WIRELESS COMMUNICATION SYSTEM, WIRELESS TRANSMISSION APPARATUS AND WIRELESS TRANSMISSION METHOD

TECHNICAL FIELD

The present invention relates to a technique for performing a wireless communication by switching a plurality of types of communication systems.

BACKGROUND ART

In a wireless communication technique well-known in the art, an uplink (referred to as an up or uplink) generally means a line through which data are transmitted from a mobile station apparatus to a base station apparatus when the base station apparatus and the mobile station apparatus communicate with each other in a cellular communication or the like. In this uplink, the base station apparatus receives signals from various mobile station apparatuses simultaneously. Therefore, if the reception powers are equal, the reception process becomes easy and reception characteristics become also excellent. In order to realize this, a system which controls a transmission power of a signal which a mobile station apparatus transmits has been introduced, which is referred to as transmission power control (TPC: Transmit Power Control).

A communication system currently used in a mobile phone of 3G (third generation) is CDMA (Code Division Multiple Access), and a plurality of mobile station apparatuses uses different codes, and accesses a base station apparatus simultaneously using the same frequency, and consequently, the TPC which is highly accurate and high-speed is generally needed. On the other hand, in the specification of a next-generation (3.9G) mobile phone, DFT-S-OFDMA (Discrete Fourier Transform-Spread-Orthogonal Frequency Division Multiple Access) is scheduled to be used as a communication system of an uplink, and the highly precise and high-speed TPC like the TPC used in the CDMA is not considered to be necessary. However, for the purpose of controlling appropriately an interference amount to an adjacent base station apparatus, the TPC has been standardized (Non-patent Document 1).

The TPC method is classified broadly into two types, and one is referred to as an open loop and the other, a closed loop. Performing description briefly assuming that the TPC is used in an uplink, the open loop TPC is one in which a mobile station apparatus controls a transmission power at it's own decision, and the closed loop is one in which a mobile station apparatus controls a transmission power at the direction of a base station apparatus.

As for the open loop, there is a method which estimates a signal attenuation quantity from the transmission power which a base station apparatus transmits and the reception power which the mobile station apparatus actually receives, and determines the transmission power of the mobile station apparatus from the estimated attenuation quantity and the reception power which is needed at the base station apparatus. On the other hand, as for the closed loop, there is a method which measures a reception power at the base station apparatus and notifies the mobile station apparatus of a shortage/overage, or a method that notifies the mobile station apparatus of an increase/decrease of the transmission power thereof from an error rate of the transmitted signal or the like.

In addition, as for a next "next generation" (4G), a technique of Carrier Aggregation which uses the systems standardized in the 3.9G in parallel in a plurality of different bands to make them as one system is investigated. There is a merit that a throughput can be simply improved by this technique.

PRIOR ART DOCUMENT

Non-Patent Document

Non-Patent Document 1: 3gpp is 36.213 v8.5.0 Chapter 5.1

DISCLOSURE OF THE INVENTION

Summary of the Invention

Problems to be Solved by the Invention

In the 3.9G, a terminal (mobile station) determines a transmission power with a parameter as shown by the following formula.

$$\text{Transmission power} = \text{Min}\{\text{maximum transmission power}, OpTx + ClTx\} \quad \text{Formula 1}$$

In the Formula 1, the OpTx is a value which each terminal determines on the basis of a propagation path loss or the like from a base station, and the ClTx is a value notified from the base station using control channel or the like. Min $\{X, Y\}$ is a function which selects the minimum. In the case of 3.9G, a bandwidth which a terminal uses is variable, and therefore, the OpTx is changed also depending on the bandwidth.

On the other hand, as for the Carrier Aggregation which is investigated in the 4G, the plurality of systems standardized in the 3.9G are used. One system of 3.9G which composes the system is referred to as a CC (Component Carrier), and each CC may be controlled independently of each other. In such a system, when a transmission power is determined by the Formula 1, the transmission power may be set at a value near the maximum transmission power. In this case, when a transmission request is made further in other CC, the latter parameter Optx+ClTx of the Formula 1 will exceed the maximum transmission power. Then, since the transmission power is set as the maximum transmission power which is the limit of capacity of the terminal, acquiring of the sufficient transmission power in each CC becomes impossible, and as a result, the reception power in each CC at the base station decreases, and a problem that an error occurs in communication is considered to occur.

The present invention is made in view of such a situation, and has an object to provide a wireless communication system, wireless transmission apparatus and wireless transmission method capable of preventing an error from occurring in communication even in the case where communication is performed independently in each CC (Component Carrier).

Means for Solving the Problem (1) In order to achieve the above-mentioned object, the present invention has taken the following measures. That is, a wireless communication system of the present invention is the one in which a wireless transmission apparatus and a wireless reception apparatus communicate with each other using a plurality of system frequency bands, wherein the wireless transmission apparatus performs transmission power control in each of the system frequency bands on transmission data, and furthermore, a maximum transmission power which can be transmitted in the each system frequency band can be controlled so as to be different from each other.

In this way, since the transmission power control in each of system frequency bands is performed on transmission data, and furthermore, the maximum transmission power which can be transmitted in each system frequency band can be controlled so as to be different from each other, the transmission power can be individually determined in each of the system frequency bands. Thereby, it becomes possible to prevent the throughput of each wireless transmission apparatus and the throughput of the whole wireless area from decreasing.

(2) In the wireless communications system of the present invention, a priority is set on each of the system frequency bands, and transmission powers of the system frequency bands are determined in descending order of the priorities.

In this way, since the transmission powers of the system frequency bands are determined in descending order of priorities, broadband communication using a plurality of system frequency bands can be performed while securing the communication performance in the system frequency bands to which the transmission powers are assigned preferentially, and it becomes possible to realize highly efficient communication.

(3) In the wireless communication system of the present invention, the priority is set in accordance with the bandwidth used for communication in each of the system frequency bands.

In the case of performing communication using a plurality of system frequency bands, if the transmission power is assigned preferentially to a system frequency band having the small number of RBs (Resource Block) to be used, an error will occur in a system frequency band having the large number of RBs to be used, and retransmission will become necessary. That is, many RBs will be used at a next transmission chance, and communication efficiency will become extremely bad. According to the present invention, since a priority is set in accordance with a bandwidth used for communication in each of system frequency bands, when the number of RBs is different in each of the system frequency bands, for example, by assigning the transmission power preferentially to communication in the system frequency band having the large number of RBs to be used, it becomes possible to perform efficient communication.

(4) In the wireless communication system of the present invention, the priority is set in accordance with whether MIMO (Multi-Input Multi-Output) communication is performed or not.

When error correction encoding is performed collectively on each stream in MIMO, that is, the number of code words is one, if an error occurs in a stream transmitted from any of antennas, an error will occur also in all other data, and many data will be lost at one time. According to the present invention, since the priority is set in accordance with whether MIMO communication is performed or not, it becomes possible to perform efficient communication by assigning the transmission power preferentially to a system frequency band which performs MIMO rather than to a system frequency band which does not perform MIMO, for example.

(5) In the wireless communications system of the present invention, the priority is set in accordance with rank of MIMO.

When error correction encoding is performed collectively on each stream in MIMO, that is, the number of code words is one, if an error occurs in a stream transmitted from any of antennas, an error will occur also in all other data, and many data will be lost at one time. According to the present invention, since the priority is set in accordance with rank of MIMO, by assigning the transmission power preferentially to a system frequency band which performs high-rank-MIMO, for example, it becomes possible to perform efficient communication.

(6) In the wireless communications system of the present invention, the priority is set in accordance with a bandwidth of the system frequency band.

In the case of performing communication using a plurality of system frequency bands, it is assumed that a wireless reception apparatus having a plurality of bandwidths uses any of system frequency bands in accordance with bandwidths capable of receiving. In such a case, if the retransmission occurs because the transmission power is not assigned in the system frequency band having a narrow bandwidth, the wireless reception apparatus which can be connected only to the band will be influenced greatly thereby. According to the present invention, since priorities are set in accordance with bandwidths of system frequency bands, by setting transmission powers in ascending order of bandwidth in system frequency bands, for example, it becomes possible to perform efficient communication.

(7) In the wireless communication system of the present invention, the priorities are set in accordance with the number of times of retransmission.

When communication is performed using a plurality of system frequency bands, if scheduling is performed independently among the system frequency bands, a case where the (n-th) retransmission data after plural times of retransmission and the first time transmission data are transmitted by different system frequency bands simultaneously will be assumed. According to the present invention, since priorities are set in accordance with the number of times of retransmission, by prioritizing retransmission data rather than first time transmission data, and by assigning data, among the retransmission data, preferentially to the system frequency band which transmits retransmission data the number of times of retransmission of which is large, it becomes possible to prevent data from being lost by time-out.

(8) The wireless communication system of the present invention performs the transmission power control on transmission data in each of the system frequency bands, on the basis of a maximum transmission power of the wireless transmission apparatus and the number of system frequency bands used simultaneously.

Even if PAPR property is good within each system frequency band, by using a plurality of system frequency bands, a problem that PAPR property deteriorates arises like a case where a multi carrier signal is transmitted. According to the present invention, on the basis of the number of system frequency bands used simultaneously as well as the maximum transmission power of the wireless transmission apparatus, the transmission power control on transmission data in each of the system frequency bands is performed, and thereby, it is possible to suppress an influence on the transmission power control caused by change in the property of the communication system.

(9) The wireless transmission apparatus of the present invention is the one applied to a wireless communication system performing communication using a plurality of system frequency bands, the device comprising: a transmission power control section which performs transmission power control on transmission data in each of the system frequency bands, and sets the maximum transmission powers which are different in each of the frequency bands; and a transmission section which radio-transmits transmission data using the system frequency bands.

In this way, since the transmission power control on transmission data in each of the system frequency bands is performed, and the maximum transmission powers which are different in each of the frequency bands are set, the transmission power can be individually determined in each system frequency band.

Thereby, it becomes possible to prevent the throughput of each wireless transmission apparatus and the throughput of the whole wireless area from decreasing.

(10) In the wireless transmission apparatus of the present invention, the transmission power control section sets priorities in the respective system frequency bands, and determines transmission powers of the system frequency bands in descending order of the priorities.

In this way, since the transmission powers of the system frequency bands are determined in descending order of priorities, it is possible to perform broadband communication using a plurality of system frequency bands, while securing the communication performance in the system frequency bands to which the transmission power is assigned preferentially, thus enabling to realize highly efficient communication.

(11) The wireless transmission method of the present invention is the one of a wireless communication system in which a wireless transmission apparatus and a wireless reception apparatus communicate with each other using a plurality of system frequency bands, the method comprising at least the steps of: performing transmission power control on transmission data in each of the system frequency bands in a transmission power control section; setting maximum transmission powers which are different in each of the system frequency bands; and radio-transmitting transmission data using the system frequency bands in a transmission section.

In this way, since the transmission power control on transmission data in each of the system frequency bands is performed, and the maximum transmission powers which are different in each of the system frequency bands are set, the transmission power can be individually determined in each system frequency band.

Thereby, it becomes possible to prevent the throughput of each wireless transmission apparatus and the throughput of the whole wireless area from decreasing.

(12) In the wireless transmission method of the present invention, in the step of performing in each of the transmission power control, priorities are set on the respective system frequency bands, and transmission powers of the system frequency bands are determined in descending order of the priorities.

In this way, since the transmission powers of system frequency bands are determined in descending order of priorities, it is possible to perform broadband communication using a plurality of system frequency bands, while securing the communication performance in the system frequency bands to which the transmission power is assigned preferentially, thus enabling to realize highly efficient communication.

Effect of the Invention

According to the present invention, since the transmission power control is performed on transmission data in each of the system frequency bands on the basis of the maximum transmission power of a wireless transmission apparatus, the transmission powers can be individually determined in respective system frequency bands. Thereby, it becomes possible to prevent the throughput of each wireless transmission apparatus and the throughput of the whole wireless area from decreasing.

BEST MODES FOR CARRYING OUT THE INVENTION

Figure 1:
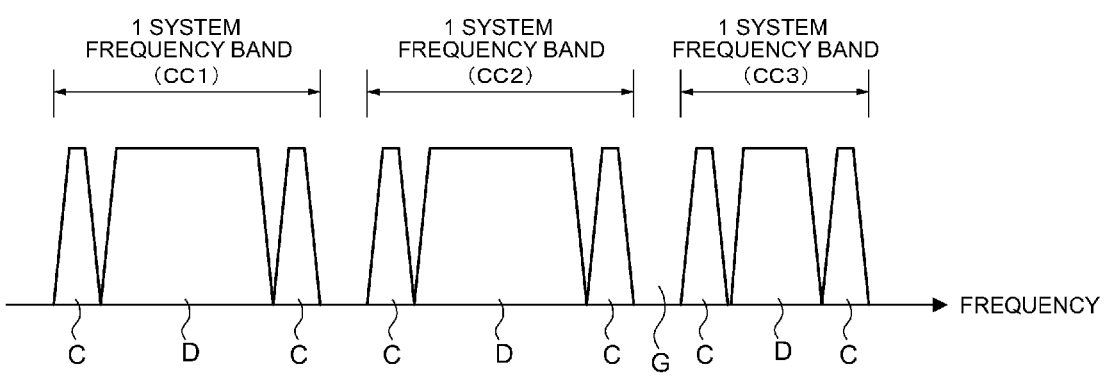
FIG. 1 is a figure showing a concept of Carrier Aggregation.

Hereinafter, embodiments of the present invention will be described with reference to the drawings. Hereinafter, a description will be given using an uplink through which data are transmitted to a base station apparatus from a mobile station apparatus, which is applicable as a matter of course also to a downlink through which data are transmitted to the mobile station apparatus from the base station apparatus. First, Carrier Aggregation (hereinafter, referred to as "CA") will be described. FIG. 1 is a figure showing a concept of the CA. FIG. 1 shows a case where three system frequency bands are used performing the CA. Each system frequency band is comprised of a control channel band C and a data channel band D, and the control channel band C is arranged at both ends of the data channel band D. A guard band G is shown between each system frequency band, but is not necessarily needed. Furthermore, a case where a guard band larger than a system frequency band is set also can be assumed. In addition, each system frequency bandwidth, as shown in FIG. 1, does not need to be the same. There is no problem even if the bandwidths are the same.

In the following embodiments, one system which constitutes the CA is referred to as CC (Component Carrier), and a frequency band which one CC uses is referred to as a system frequency band.

First Embodiment

Figure 2:
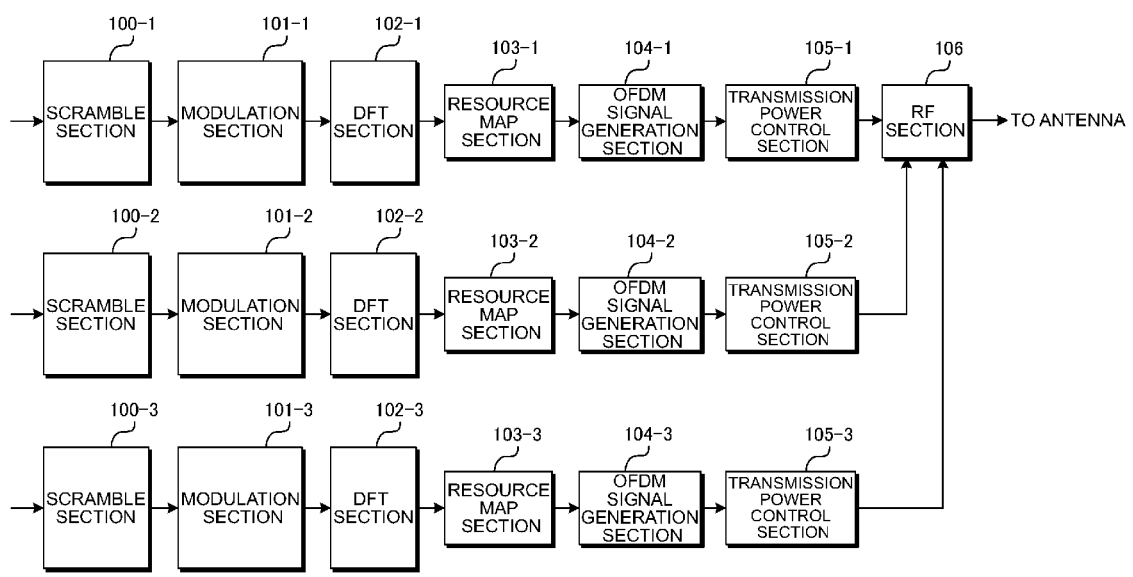
FIG. 2 is a block diagram showing an outline configuration of a transmission device which transmits a DFT-S-OFDM signal.

A first embodiment is premised on performing CA shown in FIG. 1. FIG. 2 is a block diagram showing an outline configuration of a transmission device which transmits a DFT-S-OFDM signal. However, for simplifying a description, FIG. 2 shows the minimum blocks that are needed for describing the present invention. Scramble sections 100-1 to 100-3 carrying out scrambling for the purpose of adding random nature to data, or for the purpose of adding stealth of data thereto. Modulation sections 101-1 to 101-3 perform a modulation such as a QPSK. DFT sections 102-1 to 102-3 perform DFT (Discrete Fourier Transform) on a plurality of pieces of data. DFT may be referred to as DFTPre-Coding.

Resource map sections 103-1 to 103-3 assign data to a resource block (Resource Block: hereinafter, referred to as "RB") to be used. Here, RB is comprised of one or more sub-carriers, and is the smallest unit when a mobile station apparatus accesses a base station apparatus. OFDM signal generation sections 104-1 to 104-3, when the RBs to be used are continuous in the resource map sections 103-1 to 103-3, generate a DFT-S-OFDM signal, and on the other hand, when the RBs to be used are non-continuous in the resource map sections 103-1 to 103-3, generate a Clustered DFT-S-OFDM signal. Therefore, in the transmission device shown in FIG. 2, it becomes possible to switch two access methods, DFT-S-OFDMA and Clustered DFT-S-OFDMA.

Transmission power control sections 105-1 to 105-3 perform transmission power control in each system frequency band. However, the same function can be realized also in such a manner that the transmission power control sections 105-1 to 105-3 are made to be arranged before IDFT sections (reverse DFT section) incorporated in the OFDM signal generation sections 104-1 to 104-3, and powers for respective sub-carriers are changed. The blocks described above are shown by three blocks of 1 to 3 each with hyphen, which is because the CA of FIG. 1 is premised on three system frequency bands. An RF section 106 combines inputted three signals, and outputs them to an antenna which is not shown.

The transmission power control (hereinafter, referred to as "TPC") is classified broadly into two methods. One is the TPC by a closed loop which controls transmission power based on control information notified from a base station apparatus, and the other is the TPC of an open loop which estimates in a mobile station apparatus an attenuation quantity on the basis of a distance or the like from a base station apparatus to control transmission power.

These two kinds of TPC may be used together. In order to determine the transmission power, there is a method of using the following formula, for example.

(Transmission power)=Min{maximum transmission power,$OpTx+ClTx$}      Formula 1

In the Formula 1, the OpTx is a transmission power which is determined in every mobile station apparatus, and ClTx is a correction value of a transmission power by a notification from a base station apparatus. There is a plurality of notifying methods with respect to the ClTx, such as a method of notifying by the difference from the OpTx, a method of accumulating the ClTx notified, and a method of using them together, or the like. In the Formula 1, Min is a function of selecting the smallest value of values shown in the inside of { }.

In a system where the CA is assumed, assumed is a case where scheduling, that is, assignment of RB to a mobile station apparatus, of data is independently performed in a unit of the CA. Under such assumption, when a transmission power near the maximum transmission power is being used, if communication is simultaneously started in CCs which are not used heretofore simultaneously, there arise problems such that an error occurs in the data due to rapid shortage of the transmission power, or the transmission power control of the closed loop does not function properly, or the like.

Then, problems like these can be solved by performing the transmission power control independently in each CC, and performing control so that the total transmission power does not exceed the maximum transmission power. TxP (cc1) to TxP (cc3) shown by the following formulas are the formulas for determining the transmission powers of the CC1 to CC3 (transmission power control sections 105-1 to 105-3 in FIG. 2) in FIG. 1.

$TxP(cc1)$=Min{maximum transmission power−$TxP(cc2)×a−TxP(cc3)×b,OpTx(cc1)+ClTx(c1)$}      Formula 2

$TxP(cc2)$=Min{maximum transmission power−$TxP(cc1)×c−TxP(cc3)×d,OpTx(cc2)+ClTx(cc2)$}      Formula 3

$TxP(cc3)$=Min{maximum transmission power−$TxP(cc1)×e−TxP(cc2)×f,OpTx(cc3)+ClTx(cc3)$}      Formula 4

In the Formulas 2 to 4, a, b, c, d, e and f are the constants of 0 or 1, and are determined depending on which CC the power is assigned to preferentially. For example, when priorities are the CC1, the CC2, and the CC3, a=b=d=0 and c=e=f=1. In contrast to the Formula 1, in the Formulas 2 to 4, the OpTx and ClTx are to be a value determined in each CC, and however, this means that it is possible to control independently in consideration of communication characteristic being different in each CC. However, it is not necessary that both the OpTx and ClTx are independent, and the ClTx may have a common value in all CCs.

In this way, by determining a transmission power independently in each CC, it becomes possible to perform an individual control in a unit of CC, and it becomes possible that a reception level or the like required in a base station apparatus can be set in a unit of CC. For example, in a system where a CC used preferentially in each terminal has been determined, by setting constants of a to f so that the power may be assigned preferentially to the CC, even if transmission requests are simultaneously generated in other CCs, it becomes possible to suppress influence on the CC used preferentially.

As a result of calculating the transmission power by the Formulas 2 to 4, an X shown by Min {X, Y} may become a negative value. This case means that data cannot be transmitted in the CC.

In this way, by determining the transmission power in accordance with the priorities of CCs, it is possible to perform broadband communication using a plurality of CCs, while securing the communication performance in the CC to which the transmission power is assigned preferentially, thus enabling to realize highly efficient communication as a result.

Although, in the present embodiment, a case where the maximum transmission power is set applicably using the Formulas 2 to 4 is shown, it is also possible to set the maximum transmission power in a unit of CC in advance. It is also possible to prepare a table or the like and set the maximum transmission power in each CC in accordance with circumstances.

Second Embodiment

In the first embodiment, shown is a method of determining the transmission power in accordance with priorities of CCs, and, in the present embodiment, a method of determining the priorities and an effect thereof will be described.

<A Technique 1 for Determining Priorities>

In the 3.9G, a terminal accesses a base station apparatus by frequency division multiplex, and a frequency bandwidth in which the terminal accesses is variable. Therefore, in the case of performing CA, a unit (the number of RBs) where an access is performed does not become the same in each CC essentially. In this case, if the power is assigned preferentially to a CC where the number of RBs to be used is small, an error will occur in a CC where the number of RBs to be used is large, and retransmission will be required. That is, a lot of RBs will be used at a next transmission chance. This can be said to be extremely bad in communication efficiency. Therefore, when the number of RBs is different in each CC, by assigning the power preferentially to communication of the CC where the number of RBs to be used is larger, it becomes possible to perform efficient communication.

<A Technique 2 for Determining Priorities>

In the next generation and subsequent communication, in order to realize high-speed data transmission even in an uplink, MIMO (Multi-Input Multi-Output) transmission using a plurality of antennas in transmission and reception is expected to be used. When it is considered that the CA carries out scheduling of data independently in each CC, it will be assumed that MIMO is performed or not performed, or Rank of MIMO is different, depending on a CC. Here, "Rank" refers to the number of streams transmitted simultaneously in MIMO transmission. In this case, the power is assigned preferentially to the CC which performs MIMO rather than the CC which does not perform MIMO. In the case where Rank of MIMO differs, the power is assigned preferentially to the CC which performs high-Rank-MIMO transmission. Thereby, it becomes possible to perform more efficient communication.

In the case of performing error correction encoding collectively for each stream in MIMO (where, the number of code word is one), if an error occurs in a stream transmitted from any of antennas, an error will occur also in all other data, and many data will be lost at one time. Therefore, by assigning the power preferentially to the CC which performs MIMO rather than the CC which does not MIMO, and the CC where MIMO having higher Rank is used, it is avoidable that data are lost in large quantities.

<A Technique 3 for Determining Priorities>

As shown also in FIG. 1 of the first embodiment, in the case of performing CA, the bandwidth of each CC is not necessarily the same. In a system which performs CA, it is assumed that a terminal having a plurality of bandwidths uses a CC in accordance with a bandwidth capable of receiving. In such a case, in the CC where a system frequency bandwidth is narrow, if retransmission occurs due to the power not being assigned, a terminal which can be connected only to the band will be influenced greatly thereby. Meanwhile, the influence is small in the CC where a system frequency bandwidth is wide. Therefore, by assigning the power preferentially to the transmission performed in the CC where the system frequency bandwidth is narrow, it becomes possible to perform efficient communication. For the purpose of determining priorities in detail, there is also a method of determining priorities in descending order of the ratio (transmission bandwidth/system frequency band width) of system frequency bandwidth to transmission bandwidth.

<A Technique 4 of Determining Priorities>

Usually, since the probability that an error will occur in wireless communication compared with cable communication is high, the retransmission as a method of covering that will become an important technique. If scheduling is independently performed in CCs, a case where the n-th retransmission data and the first time transmission data are transmitted by different CCs simultaneously will be assumed. In this case, by assigning the power preferentially to the CC which transmits the retransmission data rather than the first time transmission data, and among the retransmission data, the retransmission data where n is large, it becomes possible to prevent data from being lost by time-out.

Third Embodiment

In the first embodiment and second embodiment, by performing CA, a transmitted data amount increases more than in the case where CA is not performed, and therefore, a case of running short of the transmission power is considered, and countermeasures thereof have been shown. On the other hand, when the number of amplifiers in the RF section of a terminal is fewer than the number of CCs, there is a problem that a form of a transmission signal will be changed by performing CA.

A single carrier form is known as a communication system having good PAPR (Peak to Average Power Ratio) property. A multi carrier form is known as a communication system having not good PAPR property. Here, even the case of the single carrier form by DFT-S-OFDM within a CC will become a multi carrier signal if a plurality of CCs transmits a signal by CA. Furthermore, the PAPR property changes depending on the number of performing the CC.

In this case, by changing the maximum transmission power of the above Formulas 2 to 4 into the maximum transmission power in consideration of PAPR shown below, it is possible to suppress an influence on TPC caused by the change in property of the communication system.

$$\text{(Maximum transmission power in consideration of PAPR)} = \text{Maximum transmission power} - CM \times (\text{the number of } CCs) \quad \text{Formula 5}$$

Here, CM is an attenuation portion of a transmission power in consideration of an influence of the PAPR property which deteriorates by the number of CCs increasing by one. Herein, it is approximated that an influence of the PAPR property which deteriorates by performing CA is proportional to the number of CCs, but in detail, it can not be said that it is proportional. Therefore, there is also a method of having a table of attenuation quantity depending on the number of CCs, and applying it in accordance with the number of CCs.

As mentioned above, in the first embodiment to the third embodiment, description has been given by limiting the number of CCs and the communication system. However, without being limited to this, it is also possible to use OFDM as a communication system, for example.

As described above, according to the embodiments of the present invention, since the transmission power control in each of the system frequency bands on transmission data is performed on the basis of the maximum transmission power of a wireless transmission apparatus, the transmission power can be individually determined in each system frequency band. Thereby, it becomes possible to prevent the throughput of each wireless transmission apparatus and the throughput of the whole wireless area from decreasing. Since the transmission powers of the system frequency bands are determined in descending order of priorities (priority), it is possible to perform broadband communication using a plurality of system frequency bands, while securing the communication performance in the system frequency bands to which the transmission power is assigned preferentially, thus enabling to realize highly efficient communication.

DESCRIPTION OF SYMBOLS

100-1 to 100-3: SCRAMBLE SECTION
101-1 to 101-3: MODULATION SECTION
102-1 to 102-3: DFT SECTION
103-1 to 103-3: RESOURCE MAP SECTION
104-1 to 104-3: OFDM SIGNAL GENERATION SECTION
105-1 to 105-3: TRANSMISSION POWER CONTROL SECTION
106: RF SECTION

The invention claimed is:

1. A wireless transmission apparatus comprising:
    a transmission section configured to perform transmission of transmission data using a plurality of system frequency bands; and
    a transmit power control section configured to control a transmit power for transmitting said transmission data for each system frequency band of said plurality of system frequency bands,
    wherein said transmit power control section is further configured to set a reduction amount,
    wherein a maximum transmit power in case of transmitting said transmission data simultaneously using two or more system frequency bands in said plurality of system frequency bands is less than a maximum transmit power in case of transmitting said transmission data using single system frequency band in said plurality of system frequency band.

2. The wireless transmission apparatus according to claim 1, wherein said transmit power control section is further configured to calculate a difference power between said maximum transmit power set by said wireless transmission apparatus and a transmit power of said single system frequency band, and said transmit power control section is further configured to control a transmit power for said transmission data transmitted outside said single system frequency band so as not to exceed said difference power.

3. The wireless transmission apparatus according to claim 2, wherein said transmit power control section is further configured to not allocate said transmit power to said transmission data transmitted outside said single system frequency band in case that said difference power becomes less than a prescribed value.

4. The wireless transmission apparatus according to claim 3, wherein said prescribed value is zero.

5. The wireless transmission apparatus according to claim 1, further comprising:
   a DFT unit configured to perform discrete Fourier transform to convert said transmission data into frequency-domain signals for each system frequency band of said plurality of system frequency bands.

6. The wireless transmission apparatus according to claim 1, wherein said single system band is a band having narrowest bandwidth in two or more plurality of system frequency bands where transmission of said transmission data is performed simultaneously.

7. A method for controlling a transmit power for a transmission apparatus, said method comprising:
   setting a reduction amount so that a maximum transmit power in case of transmitting transmission data simultaneously using two or more system frequency bands in a plurality of system frequency bands becomes less than a maximum transmit power in case of transmitting said transmission data using single system frequency band in a plurality of system frequency band; and
   controlling a transmit power for transmitting said transmission data for each system frequency band of said plurality of system frequency bands.

8. The method according to claim 7, further comprising:
   calculating a difference power between said maximum transmit power set by said transmission apparatus and a transmit power of said single system frequency band.

9. The method according to claim 8, wherein said controlling said transmit power for transmitting said transmission data transmitted outside said single system frequency band so as not to exceed said difference power.

10. The method according to claim 7, wherein said controlling is performed not to allocate a transmit power to said transmission data transmitted outside said single system frequency band in case that said difference power becomes less than a prescribed value.

* * * * *